United States Patent [19]

Einiger et al.

[11] Patent Number: 5,635,116
[45] Date of Patent: Jun. 3, 1997

[54] METHOD FOR REPAIRING CRACKS IN WINDSHIELDS

[75] Inventors: Kenneth M. Einiger, Fort Lauderdale, Fla.; Steve J. Christian, Des Moines, Iowa

[73] Assignee: New Glass, Inc., Fort Lauderdale, Fla.

[21] Appl. No.: 479,754

[22] Filed: Jun. 7, 1995

[51] Int. Cl.⁶ .................................................. B32B 35/00
[52] U.S. Cl. ............................... 264/36; 156/94; 425/12
[58] Field of Search ......................... 264/36; 425/11–12; 156/94

[56] References Cited

U.S. PATENT DOCUMENTS

| | | | |
|---|---|---|---|
| 3,841,932 | 10/1974 | Forler et al. | 264/36 |
| 4,200,478 | 4/1980 | Jacino et al. | 264/36 X |
| 4,280,861 | 7/1981 | Schwartz | 264/36 X |
| 4,597,727 | 7/1986 | Birkhauser, III | 264/36 X |
| 4,744,841 | 5/1988 | Thomas | 264/36 |
| 4,753,695 | 6/1988 | Alexander et al. | 264/36 |
| 4,840,551 | 6/1989 | Lay et al. | 264/36 |
| 4,919,603 | 4/1990 | Herold et al. | 264/36 |
| 4,961,883 | 10/1990 | Jacino et al. | 264/36 |
| 4,995,798 | 2/1991 | Ameter | 264/36 |
| 5,069,836 | 12/1991 | Werner et al. | 264/36 |
| 5,104,304 | 4/1992 | Dotson | 264/36 |
| 5,116,441 | 5/1992 | Campfield, Jr. | 264/36 |
| 5,122,042 | 6/1992 | Einiger | 264/36 |
| 5,234,325 | 8/1993 | Hill | 264/36 |
| 5,372,761 | 12/1994 | Anderson, Sr. | 264/36 |
| 5,425,827 | 6/1995 | Campfield | 264/36 |
| 5,512,116 | 4/1996 | Campfield | 264/36 |

*Primary Examiner*—Karen Aftergut
*Attorney, Agent, or Firm*—Malin, Haley, DiMaggio & Crosby, P.A.

[57] ABSTRACT

A method for repairing a crack in a windshield wherein the windshield has an outer glass member and an inner-glass member, and wherein the crack is disposed within either the outer glass member or the inner glass member. The method includes the steps of (a) applying pressure to either the outside glass member or the inside glass member, depending in which glass member the crack is disposed, to expand the width of the crack; (b) depositing a repair material at predetermined positions within the crack to allow the deposited material to flow within and fill the crack by capillary action; and (c) creating an anaerobic activity upon said crack.

19 Claims, 3 Drawing Sheets

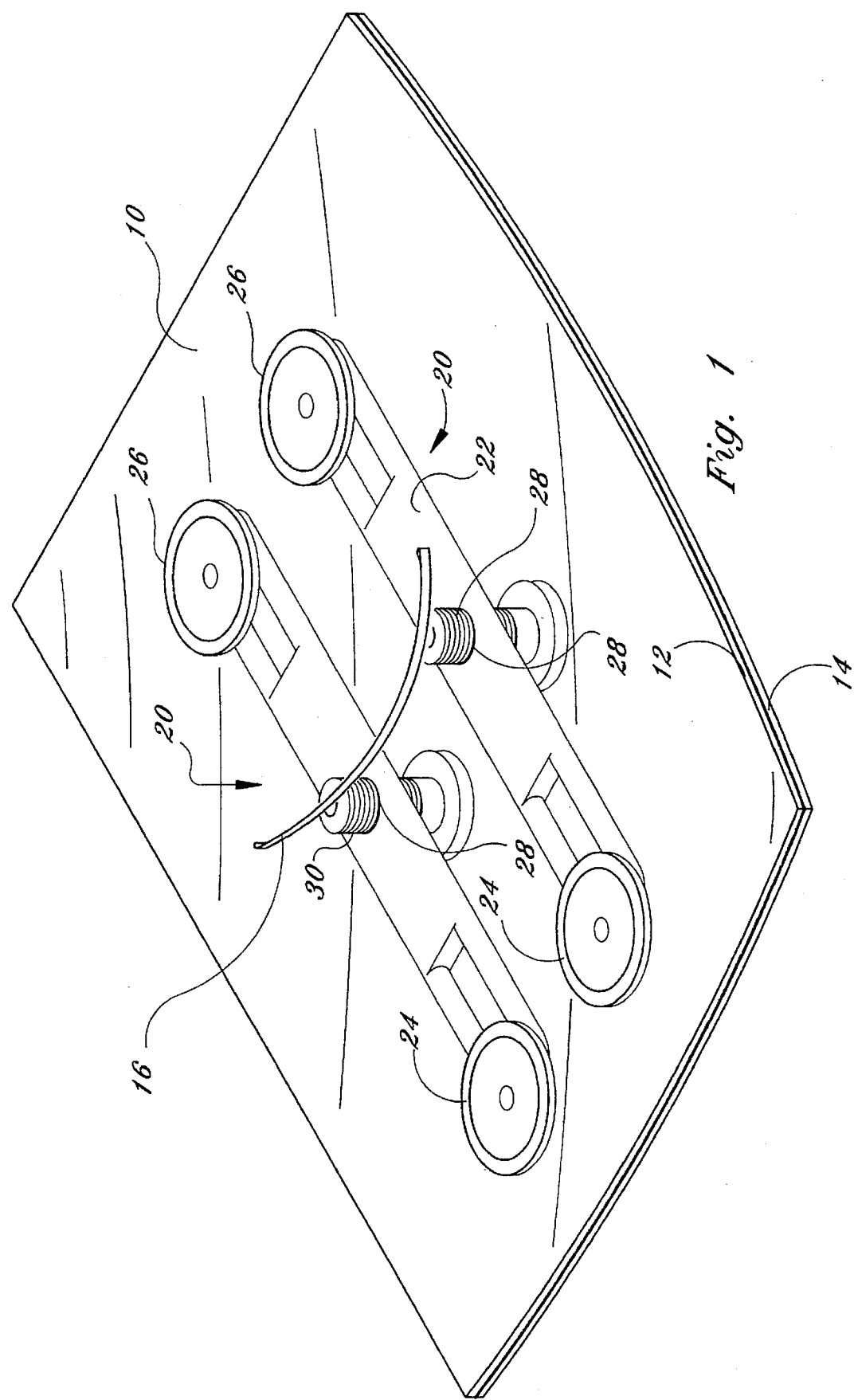

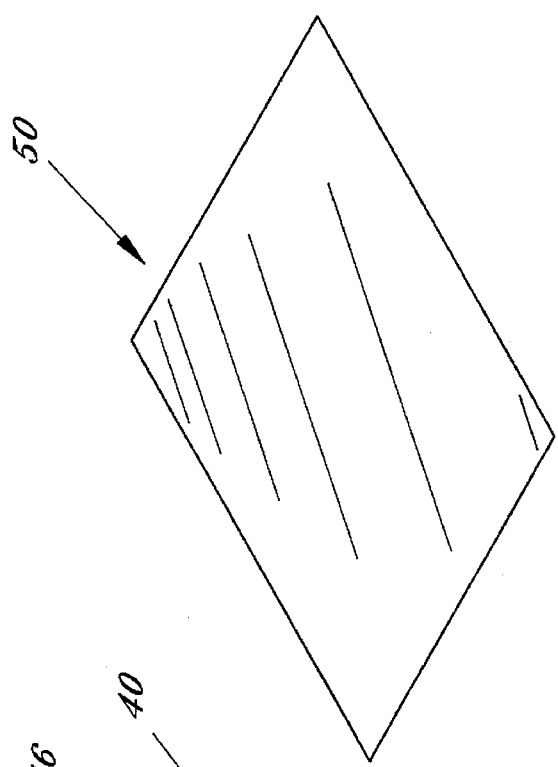
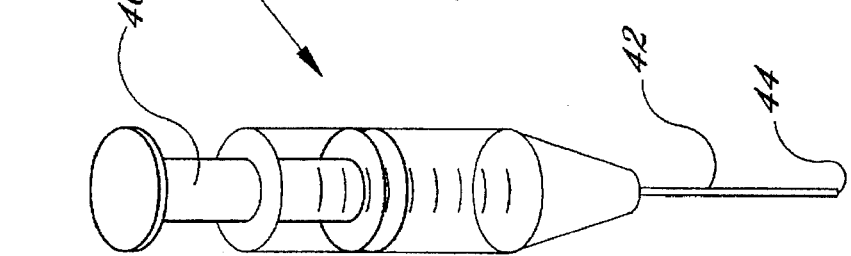
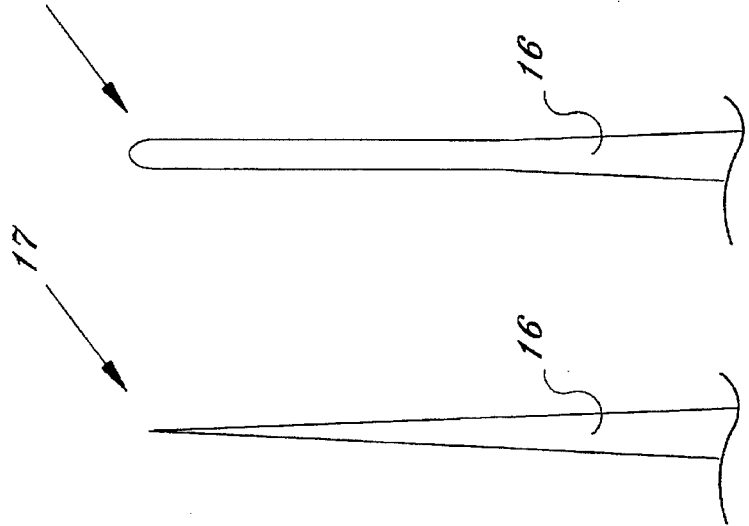

METHOD FOR REPAIRING CRACKS IN WINDSHIELDS

BACKGROUND OF THE INVENTION

1. Field of the Invention

The present invention relates generally to glass crack repair, and more particularly, to a method for repairing long cracks in vehicle windshields.

2. Description of the Prior Art

Prior to 1970, most vehicle windshields were constructed from one piece tempered glass. One problem with the tempered windshields was that they were known to easily shatter. Accordingly, since early 1970 most vehicle windshields have been constructed from laminated glass commonly referred to as "VIRICON". Typically, the windshield contains two pieces of the VIRICON glass. Sandwiched between the two pieces of glass is a clear polyvinyl material, which helps hold the windshield together, as well as providing protection to the windshield.

In use, cracks may occur in the VIRICON constructed windshield. These cracks can occur for various reasons, including stress cracks which signal structural integrity problems, as well as cracks associated with rock chips.

Several devices have been utilized in the past for repairing cracks in the windshields. Examples of such devices include U.S. Pat. No. 5,122,042 issued to Einiger; U.S. Pat. No. 5,116,441 issued to Campfield, Jr.; and U.S. Pat. No. 4,820,148. These devices are used solely for crack repair which is performed on the "outside" piece of windshield glass. U.S. Pat. No. 5,122,042 issued to Einiger discloses an apparatus for repairing cracks in a windshield which includes a mounting bracket having a plurality of arms. Each arm has a suction cup attached to it for securing the mounting bracket to the windshield to be repaired. One of the suction cups is removable for attachment at a second location on its associated arm. An injector tube is attached to the mounting bracket and extends through an aperture in the center of the mounting bracket. When it is desired to repair cracks near the periphery of the windshield, the removable suction cup is attached to its second location and the injector tube is attached to the suction cup's original location.

U.S. Pat. No. 5,116,441 issued to Campfield, Jr. discloses a kit for repairing glass cracks by insertion of a resin having an index of refraction substantially that of the glass. The tools which are included in the kit are a repair bridge and a repair bar which may be placed on an automobile windshield and used to inject resin into a glass crack and a crack spreader which may be placed on the inside of a windshield and used to spread the crack to facilitate entry of the resin.

U.S. Pat. No. 4,820,148 issued to Anderson discloses a windshield repair device which comprises a first vacuum device for repairing relatively large imperfections, a second vacuum device for repairing relatively small imperfections adjacent the windshield periphery, and a platen to secure the second vacuum device to the windshield. The first vacuum device evacuates a relatively large area over a chip or crack and injects ultra-violet light-settable polymer resins into the evacuated imperfection. The second vacuum device is essentially the inner portion of the first vacuum device and is capable of evacuating a much smaller area. The second vacuum device is primarily useful either at the periphery of the windshield, or on areas of windshields having a high degree of curvature. The platen assists in holding the second vacuum device to the windshield.

Previous crack repair devices require specialized injectors and bridges which require frequent adjustments during operation. Furthermore, lubrication is required to allow the specialized injector and bridge to slide across the windshield. These lubricants have been known to cause crack contamination. Additionally, prior art crack repairs often require the repairer to drill the end of the crack, which creates an additional fracture at such end. The drilling typically leaves marks in the windshield and often traumatizes the crack, which causes it to run further, thus, creating an additional repair item. Furthermore, prior art devices rely on gravity feed, thus allowing for repairing only the outside glass member of the windshield.

Accordingly, what is needed in the art is a method for repairing windshield cracks, which does not require specialized injectors and bridges and which can be completed relatively easily and within a relatively short period. What is also needed is a method which allows for repairing cracks disposed on either the outside glass member or the inside glass member. It is, therefore, to the effective resolution of the aforementioned problems and shortcomings that the present invention is directed.

SUMMARY OF THE INVENTION

The present invention discloses a method for repairing cracks in either the outside or inside glass member of a vehicle windshield. When repairing a crack disposed in the outside glass member, conventional crack expanders are applied to the windshield from inside the vehicle. When repairing a crack disposed in the inside glass member, conventional crack expanders are applied to the windshield from outside the vehicle. Preferably, the expanders should be applied along the crack at a distance of approximately six inches from each other. In addition, the expanders should not be placed within approximately three inches from the very end of the crack.

When repairing a crack in the outside glass member, the windshield may be heated from within the vehicle around the end of the crack to prevent such end from "running" during the application of the crack expanders. The vehicle's cigarette lighter may be used for such heating purposes. However, such is not limiting and any heating device may be utilized. It should be noted that the windshield should not be heated any hotter than the temperature of a warm sunny day or around 75°–80°. Preferably, an area of four inches surrounding the end of the crack should be heated.

Once the crack expanders have been properly applied, a two-part epoxy is mixed. Preferably, the epoxy will be mixed within a conventional syringe, which will now be described further. The tip of the needle member of the syringe is inserted in a catalyst compound, which will draw out one part, as indicated by the syringe, of the hardening catalyst. Once drawn, the tip of the needle is wiped clean by a clean towel or other material which is free from dirt or other debris. The tip of the needle is then inserted in the epoxy to draw out five parts of repair epoxy. The indicator markings should now read a total of six parts. The syringe is then rotated, or otherwise shaken, to fully mix the catalyst compound and repair epoxy. After which, the plunger member of the syringe is slightly pushed to remove the compound trapped within the needle since this portion was not mixed. Afterwards, the mixed epoxy compound is ready to be applied to the crack in the windshield.

In applying the mixed epoxy from the syringe, preferably the user starts, in one embodiment, at the center of the crack and applies one drop of epoxy from the syringe directly on the crack. After the drop of epoxy has set for several seconds, another drop of epoxy is applied to the crack three inches on both sides from the initial drop. This process is repeated until the entire length of the crack has been treated with epoxy.

Within a minute or two from applying the epoxy, capillary action will cause the epoxy to successfully fill the entire length of the crack. In the case an area has trapped air bubbles in it, the user simply applies an additional drop of epoxy over the area. A few seconds later such area will fill with epoxy.

Once the crack is completely filled with epoxy, the crack expanders are removed from the windshield. However, the crack expanders should not be removed abruptly, and preferably, should be removed in unison. To achieve unison removal of the crack expanders, the crack expanders should be loosened by a single turn of the screw at a time. This process should be repeated until all the pressure-screws of the crack expander are no longer touching the glass. Once the pressure of the screws has been released, the crack expanders may be removed from the glass or windshield, by conventional means, such as a carbide pick.

Any excess epoxy that is present on the surface of the windshield should be removed by conventional means, such as a clean razor blade which scrapes the excess resin off the glass. A cloth or other absorbent material should not be used for this process, as it may absorb the uncured epoxy from the crack. An additional thorough cleaning of the windshield may be done later, once the epoxy has cured.

The entire process should consume no more than an hour for a normal windshield crack. At such time the epoxy is fully cured and the crack is repaired.

The repair method of the present invention eliminates the need for specialized injectors and bridges, as well as the critical and bothersome adjustments associated with use of such instruments. As the use of injectors and bridges is eliminated, it follows that windshield lubrication, used to slide the bridge across the windshield, is also eliminated. Eliminating the windshield lubrication is also beneficial as potential crack-contamination from the lubricant is avoided.

The present invention also eliminates the need for drilling the end of the crack to create an additional fracture at such end. This method is sometimes referred to as creating a "bull's-eye" at the point or end. The benefit of eliminating the need for a "bull's-eye" is that no drill marks are left on the windshield, the end of the crack is not traumatized, which can cause it to run further, and there is one less item on the windshield to repair.

Accordingly, it is an object of the present invention to provide a method for repairing windshield cracks which requires no specialized injectors and bridges.

It is another object of the present invention to provide a method for repairing windshield cracks which repairs the crack in a relatively short time period.

It is yet another object of the present invention to provide a method for repairing windshield cracks which can repair the crack with a relatively reduced amount of manual effort.

It is still another object of the present invention to provide a method for repairing windshield cracks which can repair the crack with a reduced amount of repair instruments.

It is even still another object of the present invention to provide a method for repairing windshield cracks which does not require drilling the end of the crack to create an additional fracture at such end.

It is a further object of the present invention to provide a method for repairing windshield cracks which provides more predictable repair results.

It is an even further object of the present invention to provide a method for repairing windshields which provides for better visibility during the repair of the windshield.

It is a still further object of the present invention to provide a method for repairing cracks disposed in either the outer glass member or the inner glass member of a windshield.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 1 is a perspective view of a vehicle windshield having a crack disposed in the outer glass member of the windshield;

FIG. 2a is cutaway view illustrating a pointed end for a crack disposed in the outer glass member of the windshield;

FIG. 2b is cutaway view illustrating a blunt-like end for a crack disposed in the outer glass member of the windshield;

FIG. 3 is a perspective view of a conventional syringe utilized in practicing the method of the present invention;

FIG. 4 is a perspective view of a conventional film tab utilized in practicing the method of the present invention.

DESCRIPTION OF THE PREFERRED EMBODIMENTS

Figure 5:
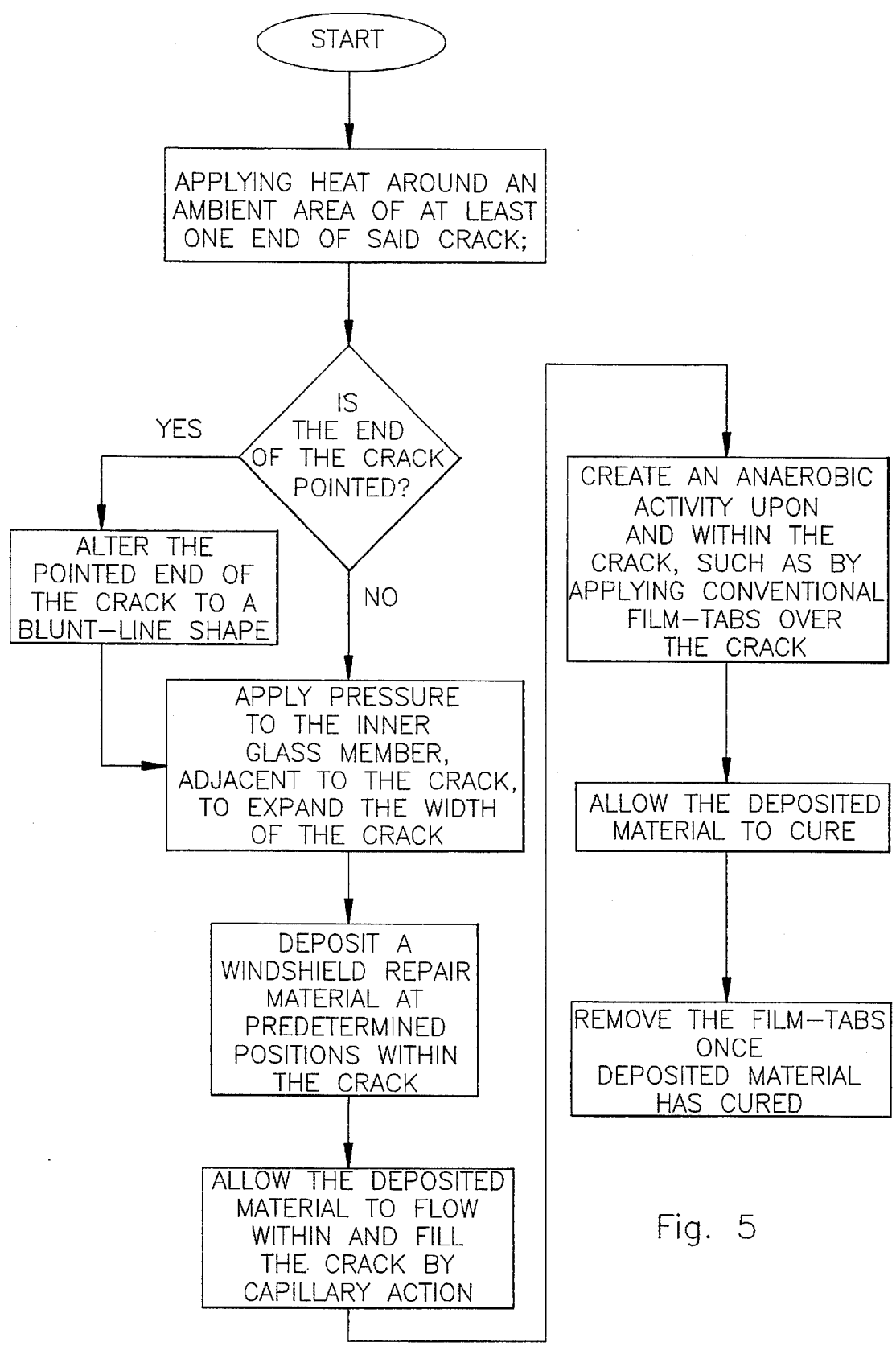
FIG. 5 is a flowchart illustrating the method of the present invention.

As seen in the drawings, a method is disclosed and shown for repairing cracks in vehicle windshields such as windshield 10. Windshield 10 consist of an outside glass member 12 and an inside glass member 14. Outside glass member 12 may also be referred to herein as the primary piece of glass, while inside glass member 14 may also be referred to herein as the secondary piece of glass. As seen in the drawings a crack 16 is disposed within outside glass member 12. A rock chip (not shown) may be disposed at one end of crack 16 within glass member 12. However, the present invention may be utilized to repair cracks not associated with rock chips, such as stress cracks due to structural integrity problems.

Initially, the repairer should attempt, if necessary, to alter or change end 17 of crack 16, if such end has a pointed shape (FIG. 2a). Preferably, the altered shape should be blunt-like (FIG. 2b). The altered shape ensures that end 17 fills properly, when the resin or epoxy is inserted within crack 16, to be discussed in detail below. However, the present invention may be practiced with a crack having a pointed end.

When repairing a crack 16 disposed in primary glass member 12, conventional crack expanders 20 are, preferably, applied to the secondary glass member 14 of windshield 10 from inside the vehicle adjacent crack 16. When repairing a crack disposed in secondary glass member 14, crack expanders 20 are applied to primary glass member 12 adjacent the crack. However, other conventional methods for expanding crack 16 may be utilized, and includes applying hand pressure from inside glass member 14 or outside glass member, depending on which glass member crack 16 is disposed.

Crack expanders 20 include a bridge member 22, having a first suction cup 24 attached at a first end of bridge member 22 and a second suction cup 26 attached at a second end of bridge member 22. A threaded aperture 28 extends through bridge member 22 for receipt of a threaded pressure screw 30. Preferably, crack expanders 20 should be applied along crack 16 at a distance of approximately six inches from each other. In addition, the expanders should not be placed within approximately three inches from the very end of crack 16 to help prevent the end of crack 16 from "running" when attaching crack expanders 20 to windshield 10.

The six and three inch distances are stated by way of example, and should not be considered limiting, and other distances are considered within the scope of the present invention. Though the use of crack expanders 20 are preferred, the method of the present invention is not dependent on such. Accordingly, though preferred, it is not essential to provide mechanical expanders when practicing the present invention.

When applying crack expanders 20, water or some other liquid agent, is sprayed on suction cups 24 and 26, to aid in moving crack expander 20 along inside glass member 14 or outside glass member 12 of windshield 10 for precise positioning, as well allowing suction cups 24 and 26 to stick better to inside glass member 14 or outside glass member 12, depending on which glass member crack 16 is disposed.

When altering the shape of end 17 of crack 16, a crack expander 20 is positioned along crack 16, to allow threaded pressure screw 30 to be disposed over crack 16, near end 17, but not exactly at end 17. Applying the pressure point at end 17 may cause crack 16 to "run", thus increasing the work required to repair crack 16.

Furthermore, heat can be applied to windshield 10 around the ambient area of end 17 ahead of crack 16, also to help prevent crack 16 from running during the application of crack expanders 20. The heat expands the glass into itself, which molecularly tightens the material, making it more denser, so that crack 16 does not continue to run. Once crack expanders 20 have been applied, with threaded screw 30 applying pressure near end 17, manual pressure is applied by the repairer at end 17 to alter the shape of end 17.

The vehicle's cigarette lighter may be used for such heating purposes described above. However, such is not limiting and any heating device may be utilized. It should be noted that the windshield should not be heated any hotter than the temperature of a warm sunny day or around 75°–80°. Preferably, an area of four inches surrounding the end of the crack should be heated. However, this measurement is by stated by way of example and is not to be construed as a limitation.

Once crack expanders 20 have been properly applied, in one embodiment a two-part epoxy is mixed. Preferably, the epoxy is mixed within a conventional syringe 40 (FIG. 3), such as a 4 cc syringe. A conventional syringe 40 is preferred over pressurized injectors, as the use of conventional syringe 40 provides a more accurate repair with less of a chance for air pockets. A tip 44 of a needle member 42 of syringe 40, which may be either sharp or blunt, is inserted in a catalyst compound, and draws out one part, as indicated by syringe 40, of the hardening catalyst.

Once drawn, tip 44 is wiped cleaned by a clean towel or other material which is free from dirt or other debris. Tip 44 is then inserted into the epoxy to draw out five parts of repair epoxy. The indicator markings should now read a total of six parts. Syringe 40 is then rotated, or otherwise shaken, to fully mix the catalyst compound and repair epoxy. After which, a plunger member 46 of syringe 40 is slightly pushed to remove the compound trapped within needle 42 since this portion is not mixed. Afterwards, the mixed epoxy compound is ready to be applied to crack 16 disposed in either outer glass member 12 or inner glass member 14 of windshield 10.

In lieu of mixing the two parts of epoxy in syringe 40, a mixture having the ratio of one part hardening catalyst and five part repair epoxy may be utilized. In such case, the repairer simply inserts needle 42 of syringe 40 into the mixture to draw in a portion of the mixture into syringe. Furthermore, other conventional devices, such as eye droppers, plastic bottles, etc. may be utilized in lieu of syringe 40 and are to be considered within the scope of this invention.

In lieu of the two-part epoxy, a conventional single resin may be utilized, such as an acrylic resin. The resin may consist of a mixture of the following methoacrylic acid, wetting agents and photoinitiators. The epoxy is preferred over the resin where time is not of the essence, as the epoxy has a viscosity of between 25–50 CPS and a bonding strength of 12,000–15,000 PSI, while the resin has a viscosity of approximately 100 CPS and a bonding strength of 9600 PSI. Thus, the use of epoxy provides a stronger repair as compared to the resin. However, where time is critical, the resin may be preferred over the epoxy, as the epoxy takes longer to cure.

It is to be understood that the method of the present invention is not dependent on any one repair material and that any existing conventional repair material may be utilized with the present invention, such as epoxy, acrylic, urethane, etc. The conventional syringe can be used with all materials. However, with at least the acrylic resin, no mixing is involved, as only a single resin is utilized.

In applying the mixed epoxy from syringe 40, preferably the user starts, in one embodiment, at the center of crack 16 and applies, at most, one drop of epoxy or resin from syringe 40 directly on crack 16. After the drop of epoxy has set for several seconds, another drop of epoxy is applied to crack 16 three inches on both sides from the initial drop. This process is repeated until the entire length of crack 16 has been treated with epoxy. By way of example, only a few drops of resin or epoxy are required to repair a ten (10") inch crack.

In another embodiment, the repairer starts applying the epoxy or resin at one end of crack 16. In either embodiment, the repairer waits to apply additional resin or epoxy, thus allowing the resin or epoxy to flow and fill in crack 16 by adhesion and cohesion principles, mixed with capillary action. The entire crack 16 is not filled at once, in order to allow the air to escape.

The repairer may wish to slightly re-coat the area of crack 16 in which the epoxy or resin has been previously applied to prevent air from getting back into crack 16. To slightly re-coat, a small amount of epoxy or resin may be applied by syringe 40 over the previously applied epoxy or resin. In lieu of re-coating by syringe, conventional film-tabs 50 (FIG. 4), having the epoxy or resin disposed thereon, may be placed over crack 16 where the epoxy or resin has been previously applied. Film-tabs 50 may be flat pieces of plastic which are, preferably, 10 millimeters thick. Film-tabs 50 create an anaerobic activity on the crack causing a deprivation of air. Thus, the epoxy or resin cures better with the use film-tabs 50.

Within a minute or two from applying the epoxy or resin, capillary action will cause the epoxy to successfully fill the entire length of crack 16. The capillary action allows the resin or epoxy to fill in crack 16. The travel of the drop of resin or epoxy within crack 16 is dependent on the following factors: (1) how wide the crack is; (2) the temperature of the windshield; (3) the viscosity of the repair material utilized; (4) how large the drop of repair material is; and (5) the angle of the crack along the windshield. In the event that an area has trapped air bubbles in it, the user simply applies an additional drop of epoxy or resin over the area. A few seconds later such area will fill with epoxy.

The use of a resin allows the material to cure within a few minutes, the use of epoxy requires anywhere up to several hours in which to cure. However, the epoxy fills the crack quicker than the resin.

Once the crack is completely filled with epoxy, crack expanders 20 are removed from windshield 10. Crack expanders 20, preferably, are not be removed from windshield 10 before the resin or epoxy has fully cured. When removing, crack expanders 20 should not be removed abruptly, and preferably, should be removed in unison. To achieve unison, crack expanders 20 are loosened, individually, by a single turn of pressure-screw 30 at a time. This process should be repeated until all pressure-screws 30 are no longer touching windshield 10. Once the pressure of screws 30 has been released, crack expanders 20 may be removed from the glass or windshield 10, by conventional means, such as a carbide pick or manually by the repairer's fingers. The carbide pick is provided for simplicity and essentially resembles a miniature ice pick having a tempered and very hard tip.

Any excess epoxy or resin that is present on the surface of windshield 10 should be removed by conventional means, such a clean razor blade which scrapes the excess resin off windshield 10. A cloth or other absorbent material should not be used for this process, as it may absorb the uncured epoxy or resin from the crack. An additional thorough cleaning of windshield 10 may be done later, once the epoxy or resin has cured.

The resin is preferably provided with photoinitiators to aid in curing with a conventional ultraviolet light of 310–380 nanometers, on the electromagnetic spectrum, when the windshield is repaired indoors, or the resin cures by the ultraviolet rays from the sun, when repairing the windshield outdoors. When repairing out-of-doors utilizing a resin for the repair material, the repairer must take precautions for preventing the sunlight from prematurely curing the resin. The photoinitiators in the resin cause the resin to harden when exposed to long-wave ultraviolet, such as that found in natural light, or sunlight. However, the problems of prematurely curing are eliminated by the use of the epoxy, as the epoxy does not contain photoinitiators. The epoxy does not cure by sunlight, but rather by the catalyst which is molecularly initiated.

The entire repair process should consume no more than an hour for a normal windshield crack. At such time the epoxy or resin is fully cured and the crack repaired.

The repair method of the present invention eliminates the need for specialized injectors and bridges, as well as the critical and bothersome adjustments associated with use of such instruments. The present invention allows for repairs of cracks disposed in either outside glass member 12 or inside glass member 14. As use of injectors and bridges are eliminated, it follows that windshield lubrication, used to slide the bridge across the windshield, is also eliminated. Eliminating the windshield lubrication is also beneficial as potential crack-contamination from the lubricant is also avoided.

The present invention also eliminates the need for drilling the end of the crack to create an additional fracture at such end. This method is sometimes referred to as creating a "bull's-eye" at the point or end. The benefit of eliminating the need for a "bull's-eye" is that no drill marks are left, the end of the crack is not traumatized, which can cause it to "run" further, and there is one less item on the windshield to repair.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for repairing a long crack in a windshield without creating any additional breaks in said windshield and without use of an injector, said windshield having an outer-glass member and an inner-glass member, said crack disposed within either said outer-glass member or said inner-glass member, said method comprising the steps of:
    (a) applying pressure to said inner-glass member to expand a width of said crack when said crack is disposed at a surface of said outer-glass member or applying pressure to said outer-glass member to expand a width of said crack when said crack is disposed at a surface of said inner-glass member;
    (b) depositing a repair material, without said use of said injector, at predetermined positions within said crack and allowing said deposited material to flow within and fill said crack by capillary action; and
    (c) creating an anaerobic environment upon said crack to deprive said crack of air to facilitate curing of said deposited repair material;
    wherein said windshield is repaired without providing any additional breaks in said windshield thus avoiding any potential traumatization of said crack.

2. The method of claim 1 further including the step of altering at least one end of said crack to a substantially non-tapered shape.

3. The method of claim 2 further including the step of applying heat around a surrounding surface of said at least one end of said crack prior to altering to prevent said crack from further running during repair of said crack.

4. The method of claim 1 wherein step (b) consists of disposing a single resin material within said crack.

5. The method of claim 1 wherein step (b) consists of disposing a two-part epoxy material within said crack.

6. The method of claim 1 wherein step (c) consists of applying at least one conventional film-tab over said crack.

7. The method of claim 1 further including the step of allowing said repair material to cure.

8. A method for repairing a long crack in a windshield without creating any additional breaks in said windshield, said windshield having an outer-glass member and an inner-glass member, said crack disposed within either said outer-glass member or said inner-glass member, said method comprising the steps of:
    (a) removably attaching at least one crack expander to said inner-glass member when said crack is disposed at a surface of said outer-glass member to apply pressure to said inner-glass member to expand a width of said crack or removably attaching at least one crack expander to said outer-glass member when said crack is disposed at a surface of said inner-glass member to apply pressure to said outer-glass member to expand a width of said crack;

(b) depositing a windshield repair material at predetermined positions within said crack and allowing said deposited material to flow within and fill said crack by capillary action; and (c) creating an anaerobic environment upon said crack to deprive said crack of air to facilitate curing of said deposited windshield repair material;

wherein said windshield is repaired without providing any additional breaks in said windshield thus avoiding any potential traumatization of said crack.

9. The method of claim 8 further including the step of allowing said repair material to cure.

10. The method of claim 9 further including the step of removing said crack expander once said repair material has cured.

11. The method of claim 8 further including the step of altering at least one end of said crack to a substantially non-tapered shape.

12. The method of claim 11 further including the step of applying heat around a surrounding surface of said at least one end of said crack prior to altering to prevent said crack from further running during repair of said crack.

13. The method of claim 8 wherein step (b) consists of disposing a single resin material within said crack.

14. The method of claim 8 wherein step (b) consists of disposing a two-part epoxy material within said crack.

15. The method of claim 8 wherein step (c) consists of applying at least one conventional film-tab over said crack.

16. A method for repairing a long crack in a windshield without creating any additional breaks in said windshield and without use of an injector, said windshield having an outer glass member and an inner-glass member, said crack disposed within either said outer-glass member or said inner-glass member, said method comprising the steps of:

(a) applying heat around a surrounding surface of at least one end of said crack to prevent said crack from further running during repair of said crack;

(b) altering said heated end of said crack to a substantially non-tapered shape;

(c) removably attaching at least one crack expander to said inner-glass member when said crack is disposed at a surface of said outer-glass member to apply pressure to said inner-glass member to expand a width of said crack or removably attaching at least one crack expander to said outer-glass member when said crack is disposed at a surface of said inner-glass member to apply pressure to said outer-glass member to expand a width of said crack;

(d) depositing a windshield repair material, without said use of said injector, at predetermined positions within said crack and allowing said deposited material to flow within and fill said crack by capillary action;

(e) applying at least one conventional film-tab over said crack to create an anaerobic environment upon said crack to deprive said crack of air to facilitate curing of said deposited windshield repair material; and (f) allowing said repair material to cure;

wherein said windshield is repaired without providing any additional breaks in said windshield thus avoiding any potential traumatization of said crack.

17. The method of claim 16 further including the step of removing said crack expander once said repair material has cured.

18. The method of claim 17 wherein step (d) consists of disposing by a conventional syringe a single resin material within said crack.

19. The method of claim 17 wherein step (d) consists of disposing by a conventional syringe a two-part epoxy material within said crack.

* * * * *